March 15, 1927.
H. J. HANSEN
DUST CAP
Filed Jan. 5, 1921
1,620,887
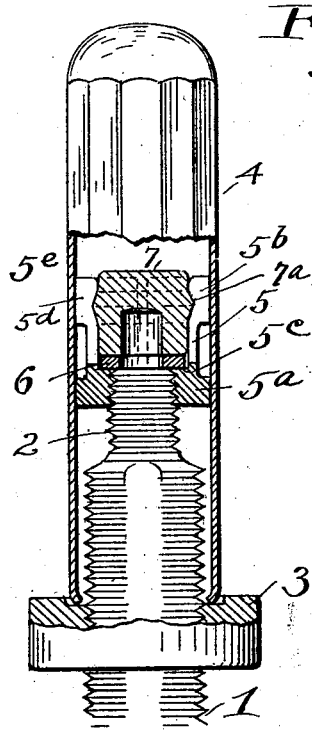
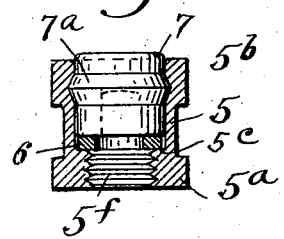
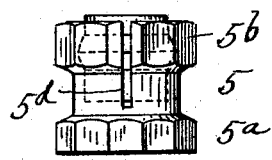
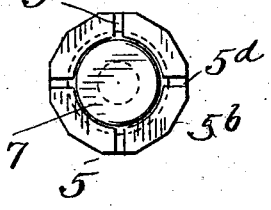
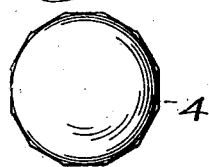
Inventor
Henry J. Hansen
Thurston Kwis & Hudson
attys Patented Mar. 15, 1927.

1,620,887

UNITED STATES PATENT OFFICE.

HENRY J. HANSEN, OF CLEVELAND, OHIO, ASSIGNOR TO THE DILL MANUFACTURING COMPANY, OF CLEVELAND, OHIO, A CORPORATION OF OHIO.

DUST CAP.

Application filed January 5, 1921. Serial No. 435,103.

The present invention relates to dust caps which are more particularly intended for use upon valve stems for pneumatic tires or threaded stems for similar or analogous articles.

One of the objects of the invention is to provide a dust cap which is quickly detachable from the threaded stem so as to obviate the necessity of turning the dust cap throughout the entire length of the valve stem.

Reference should be had to the accompanying drawings forming a part of this specification in which Fig. 1 is an elevation with portions in section showing a dust cap of the present invention attached to a valve stem; Fig. 2 is a sectional elevation of the attaching member forming part of the dust cap; Fig. 3 is an elevation of the attaching member; Fig. 4 is a top plan view of the attaching member; Fig. 5 is a top plan view of the shell of the dust cap.

Referring to the drawings, 1 indicates a valve stem which is threaded upon the exterior and at its ends has a portion of reduced diameter 2 which is also threaded upon the exterior.

3 indicates the usual rim nut which is employed in connection with valve stems. All of the foregoing construction is well known in the art and needs no extended description.

The dust cap comprises an elongated shell member 4 which is closed at its outer end and open at its inner end. The shell is formed with a series of columnar faces although the particular construction shown is not essential.

The purpose of the construction described is to prevent relative rotation of the gripping structure within the shell, as subsequently described.

Within the shell 2 is a member which is generally indicated at 5. This member has an outwardly extending base portion 5ª and an outwardly extending head portion 5ᵇ. The member 5 is hollow and is offset above the base portion 5ª as indicated at 5ᶜ forming a ledge which is adapted to receive a gasket or packing 6.

The upper portion of the member 5, that is to say, the portion which lies above the base portion 5ª is provided with a plurality of vertical slots which are indicated at 5ᵈ, thus dividing the upper portion of the member 5 into a plurality of segments and inasmuch as the member 5 is made of material which has a certain amount of inherent resiliency the upper portion of the member 5 may be expanded, as will later be described, into close contact with the inner wall of the shell member 4.

The inner wall of the member 5 and adjacent the outer end or head portion is provided with a groove 5ᵉ, the converging walls of which are preferably made slanting so that in section they would represent substantially a triangle.

Within the member 5 and closely cooperating with the walls thereof is what may be termed the expanding member 7. This member is provided with an outwardly extending ridge 7ª, the surfaces of which ridge are complementary to the surfaces of the groove 5ᵉ. In operation when the member 7 is pushed outwardly, the upper portion 5ᵇ of the member 5 is slightly expanded and when the pressure on the member 7 is released, due to the inherent resiliency of the metal of which the member 5 is made, the member 7 is pushed inwardly, thus relieving the gripping action between the member 5ᵇ and the inner wall 4.

The member 5 has a comparatively close fit within the shell member 4 but this member 5 is slidable within the shell 4.

When the dust cap complete as described is introduced over a valve stem, the threaded extension 2 cooperates with a threaded opening 5ᶠ formed in the lower part 5ª of the member 5. As the dust cap is turned, the member 2 passes through the threaded opening 5 and engages against the packing member 6, and continued rotation causes the member 7 to move slightly in a longitudinal direction thus camming outwardly the split portions 5ᵇ and causing them to tightly engage the inner wall of the member 4, thus producing what may be termed a locking action and securely holding the shell member 4 in its proper position.

In first introducing a dust cap of the construction described to a valve stem, the clamping device may be assumed to be at the lower end of the shell 4. The dust cap is introduced over a valve stem and the extension 2 of the valve stem threaded through the opening 5ᶠ of the member 5. Before the clamping action is complete the shell 4 is pushed inwardly into contact with the rim nut, or if the rim nut is not used into contact with the rim of the wheel, and then the shell is further turned, which will result in the clamping action before described which will hold the shell in its adjusted position.

When once the retaining member within the shell has been thus properly adjusted for a given length of valve stem, the dust cap may be detached and attached by merely turning the dust cap into engagement with the extension 2 or out of engagement as the case may be. This may be made a very rapid operation, inasmuch as the member 5 engages the threaded extension 2 over a limited number of threads, the number being only sufficient to give a good engagement.

As will be apparent, the device which has been described operates as a sealing member for the end of the valve stem, thus preventing the escape of air from the valve stem and taking the place of the usual valve cap which is used as a covering for the end of the valve stem.

As will be obvious, dust caps embodying the general principle of operation herein described may be made with specific embodiment differing from that which is herein shown.

Having described my invention, I claim:

1. A dust cap comprising a shell which is open at one end, a member having a central opening, within said shell, which member slidably engages with the inner wall of the shell, said member having oppositely disposed portions which may be expanded, an expanding member mounted within the central opening of said member, one of said members being provided with a groove and the other of said members being provided with an annular ridge which has a wedging engagement with said groove to expand the slidable member, the first mentioned member being provided with a threaded opening by which it may be attached to a threaded stem and the expanding member operated.

2. A dust cap comprising a shell which is open at one end, a member within said shell, a member having a central opening within said shell, which member slidably engages the inner wall of said shell, said member having expanding portions at one end thereof and at the opposite end being provided with a threaded opening by which it may be attached to a threaded stem, an expanding member within the opening of the first mentioned member and closely engaging the inner wall of said member, the said expanding member being formed with an annular ridge and the first mentioned member being formed with an annular groove upon the inner wall thereof, the said ridge and groove having a wedging engagement to expand the slidable member for the purpose described.

3. A dust cap comprising a hollow shell, one end of which is open, a slidable member engaging the inner wall of said shell, said slidable member having a cross slot extending partially through the same, thereby forming expansible portions of said slidable member, the said slidable member having a central opening, an expanding member within the said opening of the slidable member, one of said members being provided with a groove and the other of said members being provided with an annular ridge which has a wedging engagement with the groove to expand the slidable member, said slidable member being provided with a threaded opening which is adapted to engage with a threaded stem.

In testimony whereof, I hereunto affix my signature.

HENRY J. HANSEN.